Baldwin & Hawkins,
Splitting Leather,
No. 53,771. Patented Apr. 10, 1866.
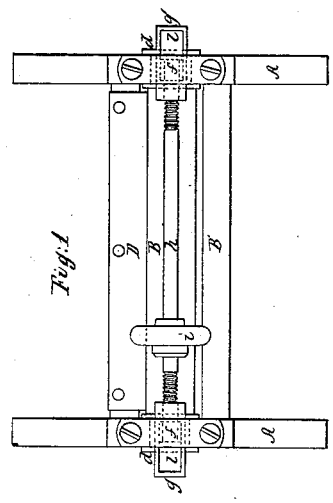
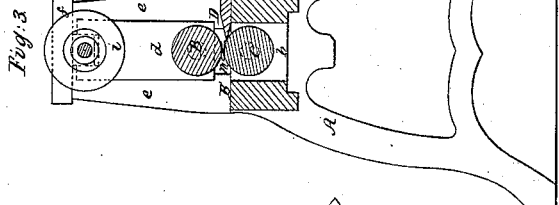
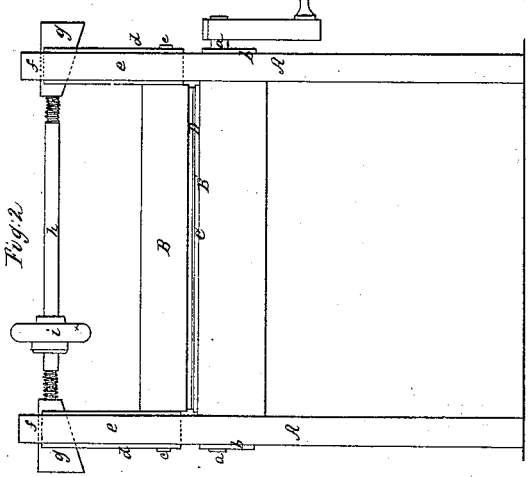
Witnesses.
Inventor
C. W. Baldwin and T. D. Hawkins
by their attorney
R. H. Eddy

UNITED STATES PATENT OFFICE.

CYRUS W. BALDWIN, OF CHARLESTOWN, AND LORENZO D. HAWKINS, OF STONEHAM, MASSACHUSETTS.

IMPROVED LEATHER-SPLITTING MACHINE.

Specification forming part of Letters Patent No. 53,771, dated April 10, 1866.

*To all whom it may concern:*

Be it known that we, CYRUS W. BALDWIN, of Charlestown, and LORENZO D. HAWKINS, of Stoneham, in the county of Middlesex and State of Massachusetts, have made a new and useful invention having reference to Machinery for Splitting Leather, such invention also being applicable to various other machines provided with rollers or devices requiring to be maintained in parallelism and nice adjustment to different distances asunder; and we do hereby declare the same to be fully described in the following specification, and represented in the accompanying drawings, of which—

Figure 1 is a top view, Fig. 2 a front elevation, Fig. 3 a transverse section, and Fig. 4 a longitudinal section, of a leather-splitting machine provided with our invention, which is designed to overcome difficulties incident to adjusting mechanisms in common use, and being composed in part of cogged wheels or beveled gears, which, particularly after having become worn, are attended with more or less play, not favorable to accurate adjustment or simultaneous movements of the elevating-screws used in connection with them.

We effect the elevation of the vertically-moving or gage roller by means of springs, and its depression by means of wedges moved equally and simultaneously by the agency of a rotary shaft provided with one right and one left threaded screw, such screws operating conjointly with corresponding female screws formed in the wedges; and for the purpose of maintaining the screw-shaft in place, or preventing it from having any endwise movement while revolving, we employ stationary abutments to extend into the wedges or into recesses formed therein, and to rest against the two opposite ends of such shaft, the whole being substantially as hereinafter explained, and as represented in the accompanying drawings.

In such drawings, A denotes the frame of the leather-splitting machine. Within the said frame are two horizontal and parallel rollers, B C, and besides them there is a narrow bed, B′, and a stationary knife, D, whose cutting-edge is arranged a little in advance of the upper part of the lower of the said rollers. The said lower roller has each of its journals *a a* supported in one of two stationary boxes, *b b*. The upper roller has each of its journals *c c* inserted in and sustained by one of two vertically-sliding boxes, *d d*, each of which is arranged between and duly supported by vertical guides *e e* forming part of the frame. There is a cap, *f*, to each pair of guides *e e*, such cap being extended from one guide to the other of the pair and being fastened thereto by screws.

A wedge, *g*, is interposed between each of the caps *f f* and the box *d*, immediately under it, the wedge being arranged in a notch formed in the box. The said wedge bears against both box and cap, the two wedges being arranged in manner as represented.

A rod or shaft, *h*, provided with a right screw at one end and a left screw at the other, and with a hand-wheel, *i*, screws into the adjacent ends of the two wedges. The helix-threads of both screws, though running in opposite directions—that is, one to the right and the other to the left—have the same pitch, in order that any rotary motion of the shaft may produce a like degree of movement of each of the wedges either toward or away from the other.

The extremities of the shaft *h* rest against two abutments, *k k*, which extend from the caps *f f* into chambers or recesses *l l* made in the wedges. These chambers, besides operating as receivers of the abutments, may, if desirable, be employed to hold oil for lubricating the screws.

Springs *m m*, having the boxes of the upper roller resting on them, and being supported upon the boxes of the lower roller and kept in place by projections *n n*, extending from the lower boxes, serve to elevate the boxes of the upper roller, and, of course, its two ends simultaneously.

From the above it will be observed that by revolving the hand-wheel shaft in one direction each of the wedges will be drawn toward the other with a like and uniform velocity, and, as a consequence, the upper or gage roller will be moved toward the lower or feed roller and kept in exact parallelism with it. So by revolving the hand-wheel shaft in the opposite direction the wedges will be moved apart and the springs will elevate the upper roller; and, furthermore, it will be observed that, owing to the peculiar arrangement and character of the mechanism for operating the upper or gage roller, such roller must, under any degree of movement of it, whether toward or away from the lower or feed roller, be maintained in exact parallelism thereto, as the operative parts are always in contact with each other, and there is no chance of their derangement by wear or backlash, as is incident to gearing when employed to operate screws.

Another advantage of our mechanism is that it enables us, by a scale made on either or each of the wedges, to place the two rollers apart from time to time at any desirable distance, or, after they have been moved to a greater or less distance asunder, to restore them to any particular distance apart.

We do not claim a leather-splitting machine composed of a narrow bed, a stationary knife, feed and gage rollers, and mechanism for simultaneously raising or lowering the opposite ends of the gage or upper roller and maintaining the two rollers in parallelism.

What we do claim as our invention or improvement is as follows—that is to say:

1. The arrangement as well as the combination of the hand-wheel shaft, its right and left screws, and the two wedges in the frame of the machine, and with the boxes of the upper or gage roller and springs, or their equivalents, applied to such boxes, substantially as specified.

2. The combination as well as the arrangement of the abutments $k\,k$ with the hand-wheel shaft, its right and left screws, and the two wedges applied in the frame of the machine, and with respect to the boxes of the upper or gage roller and the springs, or their equivalents, applied to such boxes, substantially as specified.

CYRUS W. BALDWIN.
LORENZO D. HAWKINS.

Witnesses:
R. H. EDDY,
F. P. HALE, Jr.